(12) United States Patent
Tsai et al.

(10) Patent No.: US 9,325,198 B2
(45) Date of Patent: Apr. 26, 2016

(54) WIRELESS CHARGING DEVICE

(71) Applicant: ASUSTeK COMPUTER INC., Taipei (TW)

(72) Inventors: Ming-Ting Tsai, Taipei (TW); Wei-Chen Tu, Taipei (TW); Yii-Lin Wu, Taipei (TW); Hsiang-Jue Hung, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 129 days.

(21) Appl. No.: 14/197,693

(22) Filed: Mar. 5, 2014

(65) Prior Publication Data

US 2014/0266032 A1 Sep. 18, 2014

Related U.S. Application Data

(60) Provisional application No. 61/778,457, filed on Mar. 13, 2013.

(30) Foreign Application Priority Data

Nov. 12, 2013 (TW) .............................. 102141143 A

(51) Int. Cl.
*H02J 7/00* (2006.01)
*H02J 7/02* (2006.01)
*H02J 7/04* (2006.01)
*H02J 17/00* (2006.01)

(52) U.S. Cl.
CPC ................ *H02J 7/025* (2013.01); *H02J 7/042* (2013.01); *H02J 17/00* (2013.01)

(58) Field of Classification Search
CPC ........................................................ H02J 7/025
USPC ........................................................ 320/108
See application file for complete search history.

(56) References Cited

U.S. PATENT DOCUMENTS

| 2010/0259214 | A1  | 10/2010 | Sip   |              |
|--------------|-----|---------|-------|--------------|
| 2013/0154558 | A1* | 6/2013  | Lee   | H02J 7/0052  |
|              |     |         |       | 320/108      |
| 2013/0162200 | A1* | 6/2013  | Terry | H02J 5/005   |
|              |     |         |       | 320/108      |
| 2014/0191717 | A1* | 7/2014  | Hong  | H02J 5/005   |
|              |     |         |       | 320/108      |
| 2015/0008876 | A1* | 1/2015  | Kwak  | H01F 38/14   |
|              |     |         |       | 320/108      |

(Continued)

FOREIGN PATENT DOCUMENTS

| CN | 101515729 A | 8/2009 |
|----|-------------|--------|
| CN | 102035385 A | 4/2011 |

(Continued)

*Primary Examiner* — Suresh Memula
(74) *Attorney, Agent, or Firm* — Muncy, Geissler, Olds & Lowe, P.C.

(57) ABSTRACT

A wireless charging device includes a plurality of power supply modules, a control unit and a charge module. Each of the power supply modules includes a receiver and a conduction circuit. The receiver outputs an induction current. The conduction circuit is coupled to the receiver and generates an output signal according to the induction current. The control unit is coupled to the power supply modules and generates a control signal according to the induction current outputted by the receivers. The charge module is coupled to the power supply modules and generates a charge current according to the output signal generated from the power supply modules. The control unit adjusts the maximum value of the charge current according to the number of the power supply modules which generate the induction current.

8 Claims, 4 Drawing Sheets

(56) References Cited

U.S. PATENT DOCUMENTS

| | | | | |
|---|---|---|---|---|
| 2015/0061578 A1* | 3/2015 | Keeling | ............... | H02J 7/025 320/108 |
| 2015/0061588 A1* | 3/2015 | Alves | ............... | H02J 7/0032 320/108 |
| 2015/0194838 A1* | 7/2015 | Won | ............... | H02J 17/00 320/108 |
| 2015/0200548 A1* | 7/2015 | Covic | ............... | H02J 7/025 307/104 |
| 2015/0236526 A1* | 8/2015 | Jadidian | ............... | H02J 5/005 320/108 |

FOREIGN PATENT DOCUMENTS

| | | |
|---|---|---|
| CN | 102577025 A | 7/2012 |
| TW | 541778 B | 7/2003 |

* cited by examiner

WIRELESS CHARGING DEVICE

CROSS-REFERENCE TO RELATED APPLICATION

This non-provisional patent application claims priority to U.S. provisional patent application with Ser. No. 61/778,457 filed on Mar. 13, 2013. This and all other extrinsic materials discussed herein are incorporated by reference in their entirety.

This application claims the priority benefit of Taiwan application serial No. 102141143, filed on Nov. 12, 2013. The entirety of the above-mentioned patent application is hereby incorporated by reference herein and made a part of specification.

BACKGROUND OF THE INVENTION

1. Field of the Invention

The disclosure relates to a charging device and, more particularly, to a wireless charging device.

2. Description of the Related Art

Portable electronic devices are requested to have a higher reacting speed, higher efficiency, and lighter, smaller, and thinner dimension. Generally, a portable device includes a chargeable battery to provide power. When the battery is low, the battery can be charged via a wired or wireless charger.

Although the wireless charging technology has developed for a period, its application is still limited to a low power level. If a portable electronic device needs a higher power level, it should comply with a related specification and a safety standard when a wireless charging system is conducted, so as to ensure the compatibility between different systems and avoid components damage of the wireless charging device due to large power.

BRIEF SUMMARY OF THE INVENTION

A wireless charging device including a plurality of power supply modules, a control unit and a charge module is disclosed. Each of the power supply modules includes a receiver and a conduction circuit. The receiver outputs an induction current. The conduction circuit is coupled to the receiver, and generates an output signal according to the induction current. The control unit is coupled to the power supply modules, and generates a control signal according to the induction current outputted by the receiver. The charge module is coupled to the power supply modules, receives the Output signal generated from the power supply modules and outputs a charge current. The control unit adjusts a maximum value of the charge current of the charge module according to the number of the power supply modules which generate the induction current.

In sum, in the wireless charging device, the control unit adjusts a maximum value of the charge current from the charge module according to the number of the power supply modules which generate the induction current, so as to manage and use the power source efficiently.

These and other features, aspects and advantages of the present disclosure will become better understood with regard to the following description, appended claims, and accompanying drawings.

DETAILED DESCRIPTION OF THE EMBODIMENTS

A wireless charging device is illustrated with relating figures, and the same symbols denote the same components.

Figure 1:
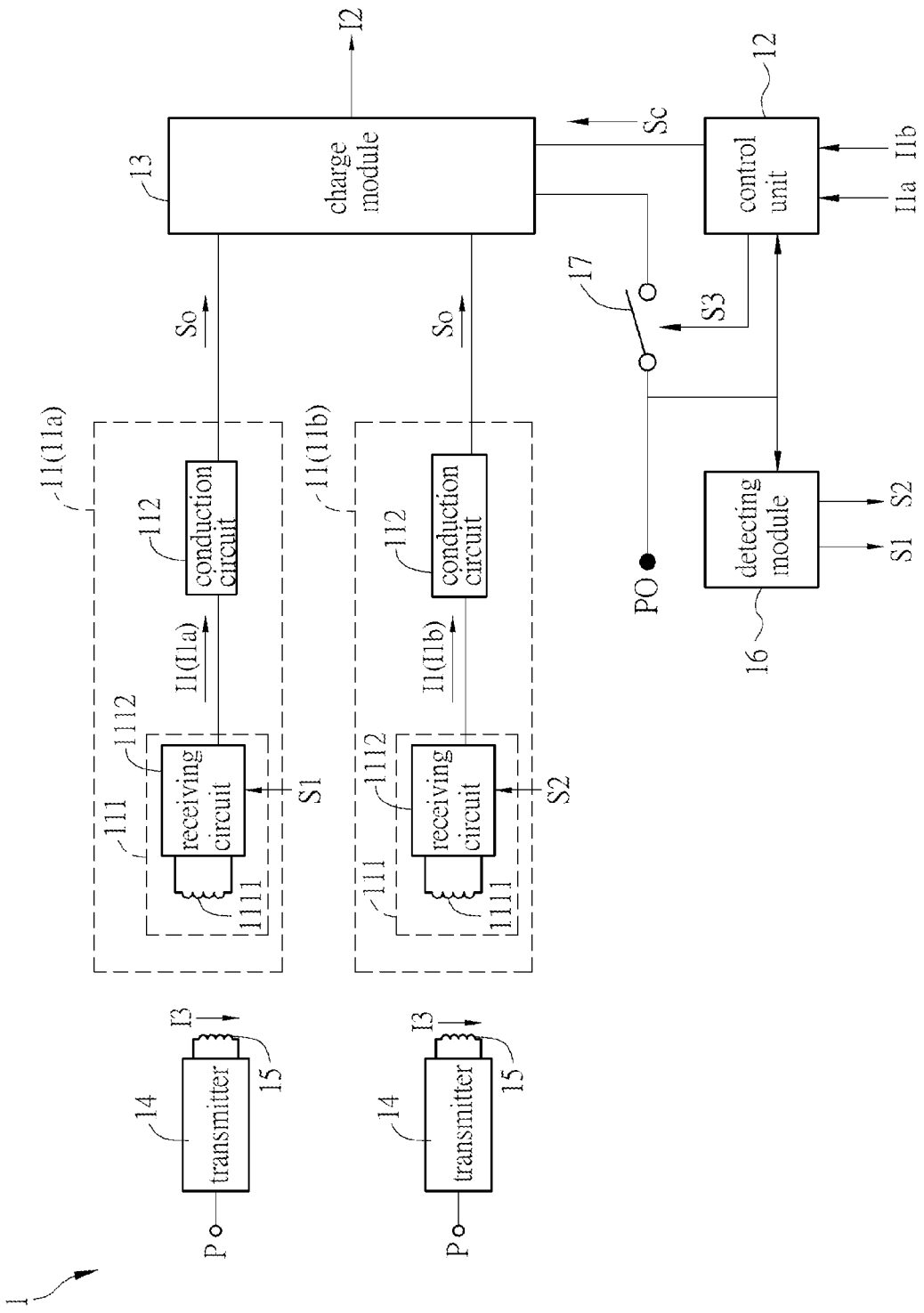
FIG. 1 is a schematic diagram showing a wireless charging device in a first embodiment.

FIG. 1 is a schematic diagram showing a wireless charging device in a first embodiment. In the embodiment, the wireless charging device 1 can charge a battery of various portable electronic devices. The wireless charging device 1 includes two power supply modules 11 (11a and 11b), a control unit 12 and a charge module 13. The power supply modules 11 are coupled to the control unit 12 and the charge module 13, respectively. In the embodiment, the wireless charging device includes two power supply modules, which is not limited herein. The number of the power supply modules can be adjusted according to requirements of circuit design and the load.

The two power supply modules 11a and 11b include same components. The power supply modules 11a and 11b include a receiver 111 and a conduction circuit 112, respectively. The receiver 111 may include a first induction coil 1111 and a receiving circuit 1112, and the receiving circuit 1112 is coupled to the first induction coil 1111 and the conduction circuit 112. When the first induction coil 1111 inducts a magnetic field, it generates and outputs an induction current I1, and the receiving circuit 1112 rectifies the induction current I1 to a direct current. The conduction circuit 112 generates an output signal So according to the induction current I1 outputted by the receiving circuit 1112. The output signal So in the embodiment may be a current signal or a voltage signal.

The control unit 12 is coupled to the power supply modules 11a and 11b, and generates a control signal Sc according to the induction current I1 outputted by the receiver 111. The control unit 12 receives the induction current I1a outputted by the receiver 111 of the power supply modules 11a and the induction current I1b outputted by the receiver 111 of the power supply modules 11b, respectively, and determines the number of the power supply modules 11 which generate the induction current I1 according to the value of the received induction current I1.

When the control unit 12 determines the received induction current I1 is zero, close to zero or smaller than a predetermined value, it can be determined that the power supply module 11 corresponding to the induction current I1 is not in operation. The charge module 13 is coupled to the power supply modules 11a, 11b and the control unit 12, receives the output signal So outputted by the power supply modules 11a and 11b and outputs a charge current I2 to a load (not shown). The control unit 12 adjusts a maximum value of the charge current I2 of the charge module 13 according to the determined number of the power supply modules 11 which generate the induction current I1.

When only one of the power supply modules 11 is in operation, for example, only the power supply module 11a is in operation, the control unit 12 detects the induction current I1a outputted by the receiver 111 of the power supply modules 11a. The control unit 12 outputs a control signal Sc to the charge module 13 according to a determining result to adjust the maximum value of the charge current I2 approximate to a current of the output signal So which is the largest power of a single power supply module 11.

When the two power supply modules 11 are in operation, the control unit 12 detects that both the power supply modules 11a and 11b output the induction current I1 which is not zero or is larger than a predetermined value. At the moment, the control unit 12 outputs the control signal Sc to the charge module 13 according to the determining result to adjust the maximum value of the charge current I2 approximate to a current which is the largest power of two power supply modules 11a and 11b.

Since the charge current I2 of the charge module 13 is generated according to the output signal So outputted by the power supply modules 11, the control unit 12 can adjust the maximum value of the charge current I2 from the charge module 13 according to the number of the power supply modules 11 which generate the induction current I1, and thus the output signal So from the power supply modules 11 can be efficiently managed and applied.

Furthermore, in the structure of the embodiment stated above, when the wireless charging device 1 switches from two power supply modules 11 in operation to only one power supply module 11 in operation, for example, one power source P is shut down. Since the charge module 13 adjusts the maximum value of the charge current I2 according to the control signal Sc outputted by the control unit 12, the whole operation of the wireless charging device 1 is not affected. Similarly, when the wireless charging device 1 switches from one power supply module 11 in operation to two power supply modules 11 in operation, since the charge module 13 can adjust the maximum value of the charge current I2 instantly, the wireless charging device 1 still can operate normally, which avoids a circuit damage due to a sudden change of the power.

In the embodiment, the wireless charging device 1 further includes a plurality of transmitters 14 and a plurality of second induction coils 15. The transmitters 14 are electrically connected to a power source P, and generate a working current I3. The second induction coils 15 are coupled to the transmitters 14, respectively, and the receiver 111 outputs the induction current I1 according to the working current I3. In detail, the transmitters 14 generate the working current I3 from the power source P, and generate a magnetic field via the second induction coil 15. Then, the first induction coil 1111 of the receiver 111 generates the induction current I1 according to the magnetic field and transmits the induction current I1 to the receiving circuit 1112.

In the embodiment, the wireless charging device 1 further includes a detecting module 16 and a switch 17. The detecting module 16 is coupled to the power supply modules 11a and 11b. The switch 17 is coupled to the charge module 13 and the control unit 12. When the detecting module 16 receives an external power source PO, it outputs multiple turn off signals S1 and S2. In the embodiment, the turn off signal S1 is outputted to the receiver 111 of the power supply modules 11a, and the turn off signal S2 is outputted to the receiver 111 of the power supply modules 11b.

When the power supply modules 11a and 11b stops outputting the induction current I1 according to the turn off signal S1 or S2, and the detecting module 16 receives an external power source PO, the control unit 12 outputs a switch signal S3 to conduct the switch 17. That means, when a power adapter is used to provide power to the charge module 13, the control unit 12 outputs the turn off signals S1 and S2 to make the power supply modules 11a and 11b stop providing power, and conduct the switch 17 to make the external power source PO provide power the charge module 13. Thus, the wireless charging module 1 in the embodiment can also be used in wired charging. When it is determined that the control unit 12 is not connected to the external power source PO, the switch 17 is cut off.

Figure 2:
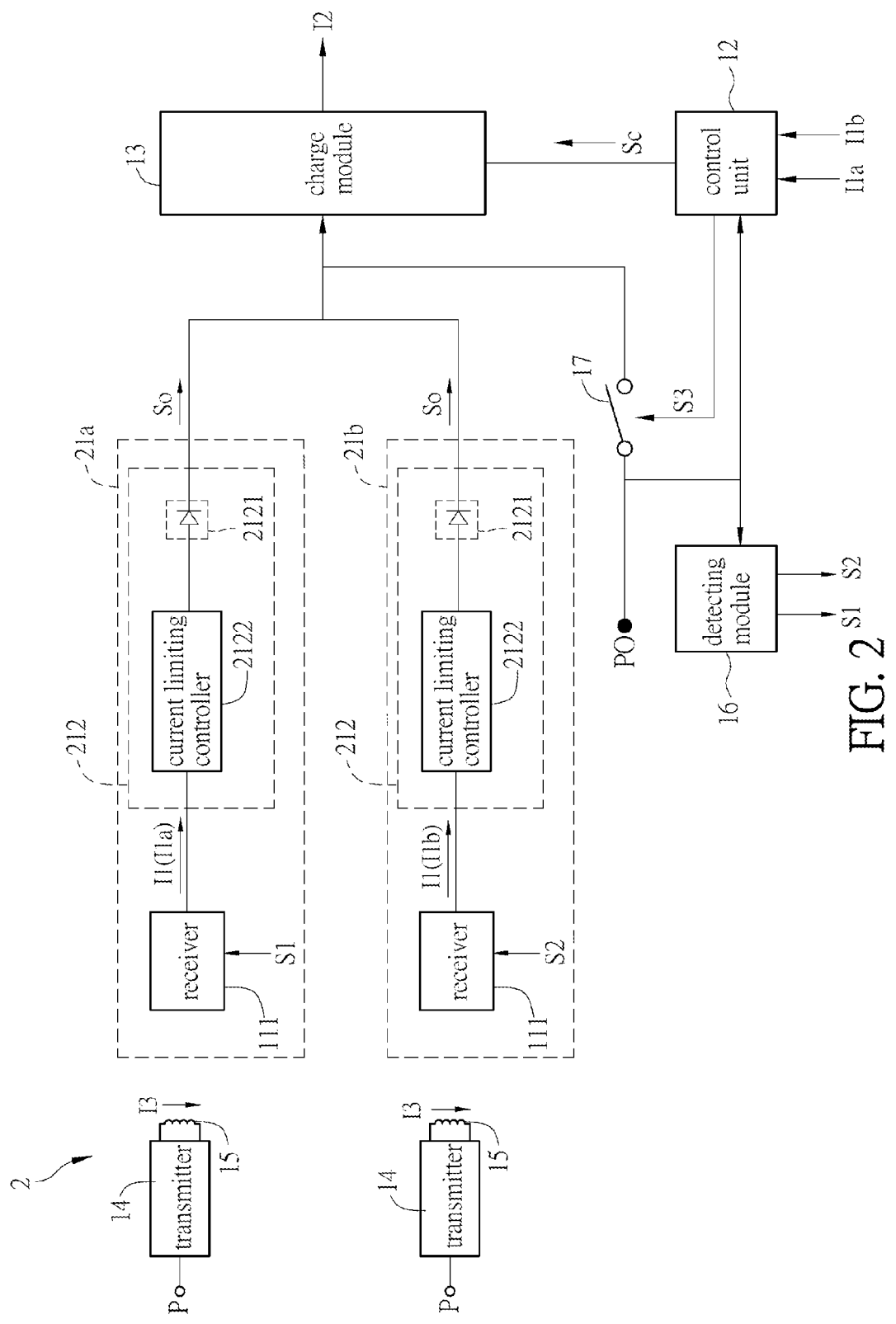
FIG. 2 is a schematic diagram showing a Wireless charging device in a second embodiment.

FIG. 2 is a schematic diagram showing a wireless charging device in a second embodiment. The difference between the wireless charging device 2 and the wireless charging device 1 is that the conduction circuit 212 of the power supply modules 21a and 21b in the wireless charging device 2 includes a switch element 2121 and a current limiting controller 2122. One end of the switch element 2121 of the power supply modules 21a and 21b is coupled to the charge module 13, and the current limiting controller 2122 is coupled to the receiver 111 and the other end of the switch element 2121.

In other words, the output signals So of the power supply modules 21a and 21b gather to the charge module 13 in a current form, and the charge module 13 outputs the charge current I2 to a load accordingly. In the embodiment, the switch element 2121 is a diode, its anode end is coupled to the current limiting controller 2122, and its cathode is coupled to the charge module 13. In other embodiments, the switch element 2121 may also be a transistor, such as a metal-oxide-semiconductor field effect transistor (MOSFET) or a bipolar junction transistor (BJT). The switch element 2121 should have a function of controlling the conducting of current, and it should conform to a safety standard of rated voltage and rated current.

Since errors may exist in circuit assembly or manufacture, the induction current I1 outputted by the receivers 111 of the power supply modules 21a and 21b may have a slight difference, which means the voltage outputted by the receivers 111 may be different. When the voltage outputted by the receiver 111 of the power supply module 21a is larger than the voltage outputted by the receiver 111 of the power supply module 21b, the power supply module 21a has a higher priority than the power supply module 21b to provide power.

At the moment, the current limiting controller 2122 of the power supply module 21a adjusts its resistance according to a detecting and determining result of the induction current I1a outputted by the receiver 111, so as to make the voltage outputted by the receiver 111 of the power supply module 21a the same as the voltage outputted by the receiver 11 of the power supply module 21b. Thus, the power supply modules 21a and 21b provide the output signals So to the charge module 13 at the same time. The current limiting controller 2122 of the power supply module 21b has the same functions as the current limiting controller 2122 of the power supply modules 21a, which is omitted herein.

Figure 3A:
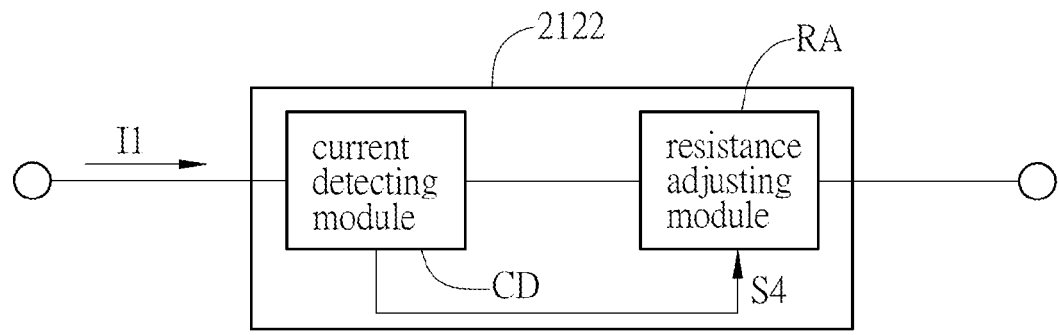
FIG. 3A and FIG. 3B are schematic diagrams showing a current limiting controller of the wireless charging device in an embodiment.

FIG. 3A is a schematic diagram showing the current limiting controller 2122 of the wireless charging device 2 in the second embodiment. Please refer to FIG. 3A and FIG. 2, in the embodiment, the current limiting controller 2122 includes a current detecting module CD and a resistance adjusting module RA. The current detecting module CD receives and detects the induction current I1, and the resistance adjusting module RA is coupled to the current detecting module CD and receives the induction current I1. When the current detecting module CD detects that the induction current I1 outputted by the receiver 111 is larger than a predetermined value, the current detecting module CD outputs a detecting signal S4 to the resistance adjusting module RA to adjust the resistance of the resistance adjusting module RA. In detail, when the induction current I1 is larger than a predetermined value, the current detecting module CD reduces the resistance of the resistance adjusting module RA to reduce the corresponding voltage.

Figure 3B:
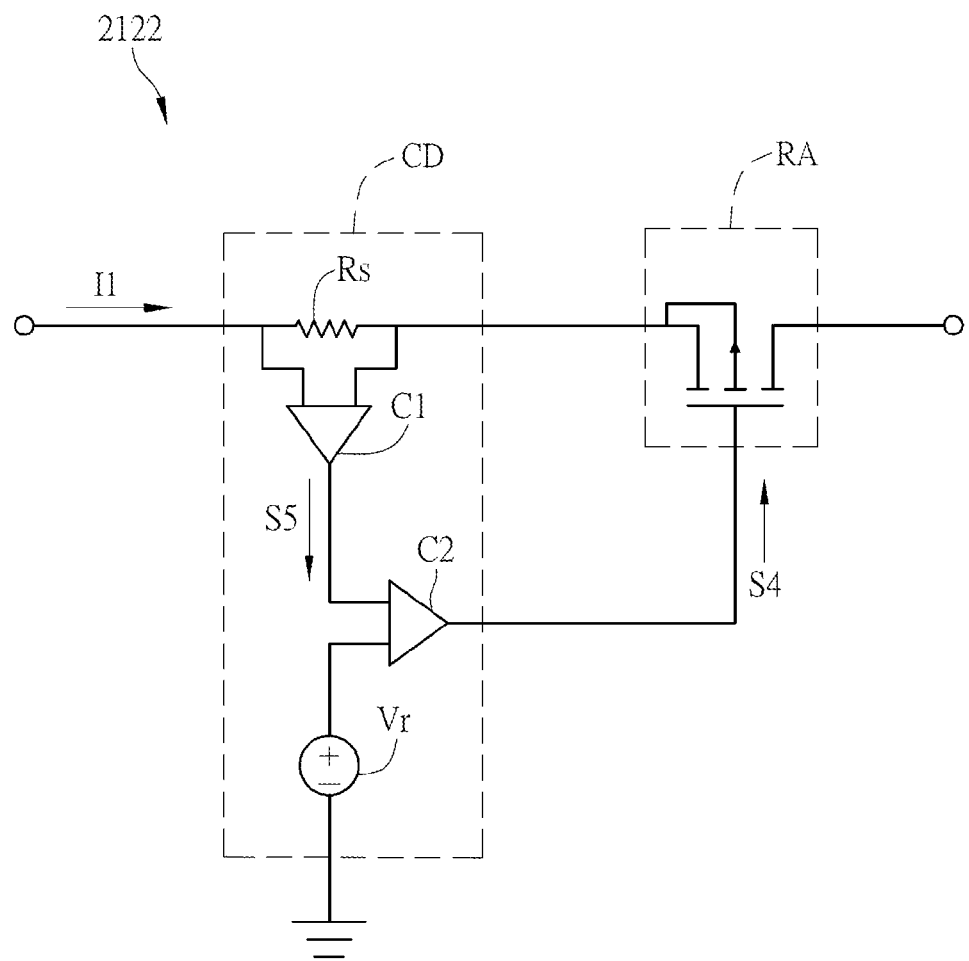

Please refer to FIG. 3B, the current detecting module CD includes a detecting resistor Rs, a first comparator C1, a second comparator C2 and a reference voltage Vr. The induction current I1 flows through the detecting resistor Rs, and thus the detecting resistor Rs has a voltage difference between its two ends. The first comparator C1 includes two inputting ends coupled to the two ends of the detecting resistor Rs, respectively, and outputs a compare signal S5 according to the voltage difference between the two ends of the detecting resistor Rs. The second comparator C2 receives the compare signal S5 and the reference voltage Vr, and accordingly outputs the detecting signal S4 to the resistance adjusting module RA to adjust the resistance of the resistance adjusting module RA. The resistance adjusting module RA may be a transistor, such as a MOSFET or a BJT, or other components which can adjust resistance.

Figure 4:
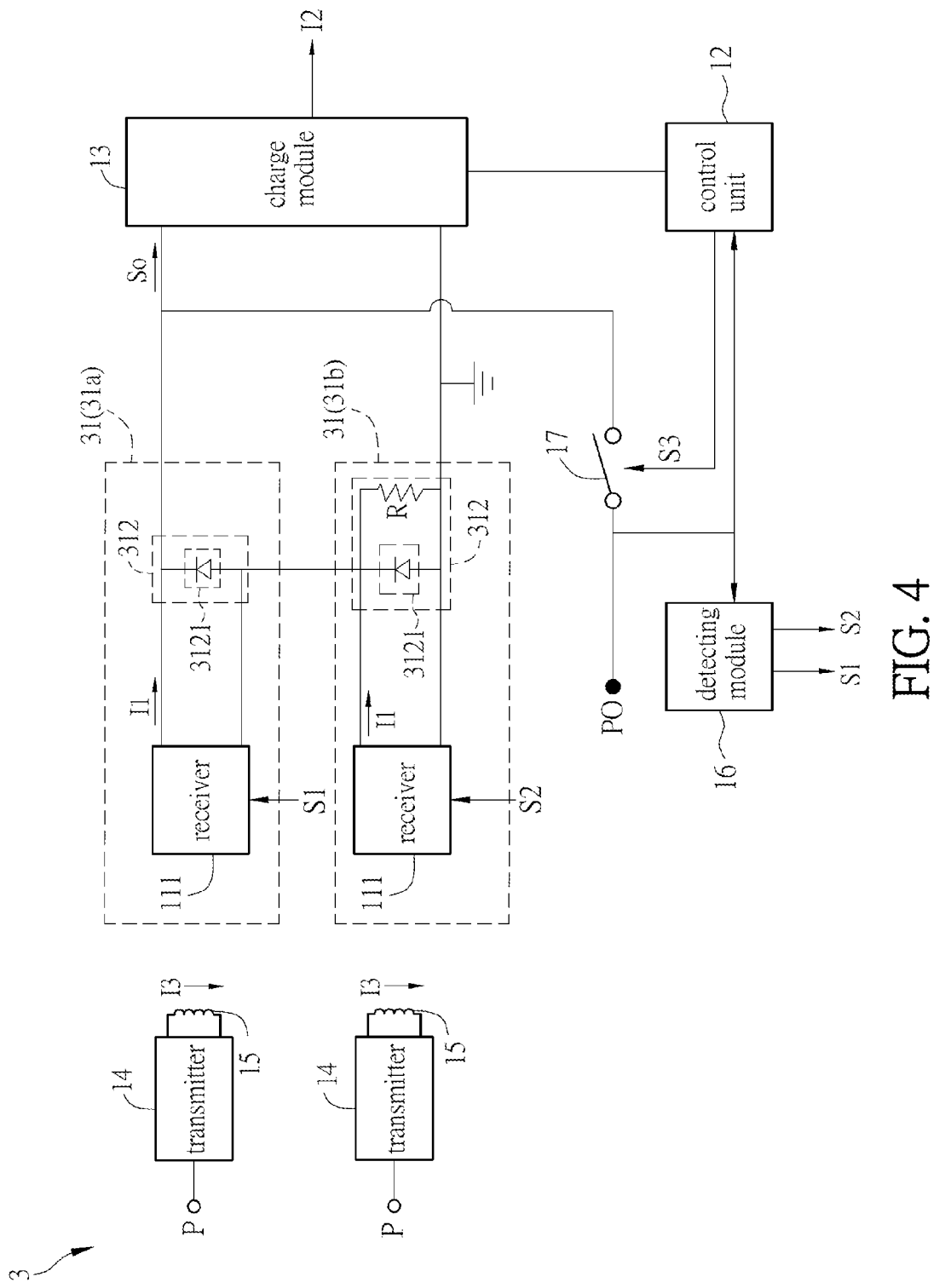
FIG. 4 is a schematic diagram showing a wireless charging device in a third embodiment.

FIG. 4 is a schematic diagram showing a wireless charging device 3 in a third embodiment. The difference between the wireless charging device 3 and the wireless charging device 2 is that the conduction circuits 312 of the power supply modules 31a and 31b in the embodiment include a switch element 3121, respectively, and the switch element 3121 is connected to the receiver 111 in parallel and is coupled to the charge module 13. The switch elements 3121 are also coupled to each other. The power supply module 31b further includes a resistance element R, and the resistance element R is connected to the switch element 3121, in parallel. In the embodiment, the switch element 3121 is a diode, and the resistance element R is a resistor, which is not limited herein. An anode end of the switch element 3121 of the power supply module 31a is coupled to a cathode end of the switch element 3121 of the power supply module 31b, which means the switch elements 3121 are connected in series.

In the embodiment, when both the power supply modules 31a and 31b output the induction current I1, the switch elements 3121 of the power supply modules 31a and 31b form an open circuit due to a reverse biased voltage, and the power supply modules 31a and 31b provide the output signals So to the charge module 13 at the same time. That means, the power supply modules 31a and 31b can provide a voltage double of that provided by one power supply module, and generate a double transmission power.

When only the power supply module 31b is in operation and outputs the induction current I1, the switch element 3121 of the power supply module 31b forms an open circuit due to a reverse biased voltage. Thus, the induction current I1 flows to the charge module 13 through the switch element 3121 of the power supply module 31a. Moreover, when only the power supply module 31a outputs the induction current Ti, the switch element 3121 of the power supply modules 31a forms an open circuit due to a reverse biased voltage, and the induction current I1 flows to the charge module 13 through the switch element 3121 of the power supply module 31b.

However, when the load does not increase, the switch element 3121 of the power supply module 31b may not be conducted and forms an open circuit, and a grounding end of the receiver 111 of the power supply module 31b floats, which results in a float of the output voltage level. Consequently, the induction current can flow through the resistance element R to form a circuit, which can avoid the floating of the grounding end of the power supply module 31b.

In the embodiment, the wireless charging device 3 can use both of the power supply modules 31a and 31b to provide the output signals So to execute wireless charging, or only use one power supply module 31. In other words, when one of the power supply modules 31 stops providing the output signal So, the other power supply module 31 is still in operation and does not stop providing power. Thus, the wireless charging device 3 can efficiently manage and apply the output signal So crated from the power supply modules 31.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A wireless charging device, comprising:
   a plurality of power supply modules, wherein each of the power supply modules includes:
   a receiver including a first induction coil and a receiving circuit coupled to the first induction coil, outputting an induction current; and
   a conduction circuit coupled to the receiver and generating an output signal according to the induction current;
   a control unit coupled to the power supply modules and generating a control signal according to the induction current outputted by the receiver; and
   a charge module coupled to the power supply modules and receiving the output signal generated from the power supply modules to output a charge current,
   wherein the control unit adjusts a maximum value of the charge current of the charge module according to the number of the power supply modules which generate the induction current.

2. The wireless charging device according to claim 1, wherein the conduction circuit includes:
   a switch element, wherein one end of the switch element is coupled to the charge module; and
   a current limiting controller coupled to the receiver and the other end of the switch element.

3. The wireless charging device according to claim 2, wherein the current limiting controller includes:
   a current detecting module detecting the induction current; and
   a resistance adjusting module coupling to the current detecting module and receiving the induction current;
   wherein when the induction current is larger than a predetermined value, the current detecting module outputs a detecting signal to the resistance adjusting module to adjust a resistance.

4. The wireless charging device according to claim 3, wherein the current detecting module further includes:
   a detecting resistor, wherein the induction current flows through the detecting resistor;
   a first comparator including two inputting ends, wherein the two inputting ends are coupled to two ends of the detecting resistor, respectively, and the first comparator outputs a compare signal according to a voltage difference between the two ends of the detecting resistor;
   a reference voltage; and
   a second comparator receiving the compare signal and the reference voltage and accordingly outputting the detecting signal to the resistance adjusting module.

5. The wireless charging device according to claim 3, wherein the resistance adjusting module is a transistor.

6. The wireless charging device according to claim 1, wherein each of the conduction circuits includes a switch element, and the switch element and the receiver are connected in parallel.

7. The wireless charging device according to claim 1, wherein the wireless charging device further includes:
- a plurality of transmitters electrically connected to a power source, respectively, and generating a working current; and
- a plurality of second induction coils coupled to the transmitters, respectively, and receiving the working current, wherein the receiver outputs the induction current according to the working current.

8. The wireless charging device according to claim 1, wherein the wireless charging device further includes:
- a detecting module coupled to the power supply modules; and
- a switch coupled to the charge module and the control unit, wherein when the detecting module receives an external power source, the detecting module outputs multiple turn off signals, the power supply modules stop outputting the induction current according to the turn off signals, and the control unit outputs a switch signal to conduct the switch.

* * * * *